United States Patent [19]
Lim

[11] Patent Number: 6,043,814
[45] Date of Patent: Mar. 28, 2000

[54] METHOD OF DISPLAYING DISPLAY MODE USING OSD

[75] Inventor: Joon-woo Lim, Kyungki-do, Rep. of Korea

[73] Assignee: SamSung Electronics Co., Ltd., Kyungki-do, Rep. of Korea

[21] Appl. No.: 09/061,038

[22] Filed: Apr. 16, 1998

[30] Foreign Application Priority Data

Apr. 16, 1997 [KR] Rep. of Korea .................. 97-13933

[51] Int. Cl.$^7$ ........................................ G06F 3/00
[52] U.S. Cl. ................. 345/326; 348/555; 345/339; 345/132
[58] Field of Search .................. 345/3, 1, 127, 345/132, 115, 213, 175, 501, 552, 521, 515, 326, 327, 334; 348/554, 555, 569, 558

[56] References Cited

U.S. PATENT DOCUMENTS

| | | |
|---|---|---|
| 5,493,317 | 2/1996 | Kim . |
| 5,500,654 | 3/1996 | Fujimoto ................................ 345/132 |
| 5,600,347 | 2/1997 | Thompson et al. .................... 345/127 |
| 5,696,531 | 12/1997 | Suzuki et al. ......................... 345/132 |
| 5,767,834 | 6/1998 | Vouri et al. ........................... 345/132 |

*Primary Examiner*—Raymond J. Bayerl
*Assistant Examiner*—Cao H. Nguyen
*Attorney, Agent, or Firm*—Robert E. Bushnell, Esq.

[57] ABSTRACT

A method of displaying a present display mode includes the steps of: detecting a changing of display node; checking a status set for using of default information; determining a present display mode considering optimize; and displaying a information of the present display mode for a predetermined time.

13 Claims, 3 Drawing Sheets

6,043,814

METHOD OF DISPLAYING DISPLAY MODE USING OSD

CLAIM OF PRIORITY

This application makes reference to, incorporates the same herein, and claims all benefits accruing under 35 U.S.C. §119 from my application entitled METHOD OF DISPLAYING DISPLAY MODE USING OSD filed with the Korean Industrial Property office on Apr. 16, 1997 and there duly assigned Serial No. 97-13933 by that office.

BACKGROUND OF THE INVENTION

1. Field of the Invention

The present invention relates to a method of displaying a display mode using an on screen display(OSD) and, more particularly, to such a method of displaying information relating to the display mode as an OSD in response to the frequency of a picture signal which has been applied to a display monitor after amplification through a computer by users.

2. Discussion of Related Art

An example of such a conventional display monitor having the OSD function will now be described below with reference to the attached drawings.

FIG. 1 is a block diagram showing the internal circuit of a conventional display monitor.

As shown in FIG. 1, computer 100 is composed of a CPU 110 for processing a keyboard signal and thereby generating an output data, and a video card 120 for processing the data received from the CPU 110 into RGB picture signals and further generating horizontal and vertical synchronizing signals H/V-SYNC which are to synchronize the RGB picture signals.

Display monitor 200 receives the RGE picture signals and the horizontal and vertical synchronizing signals H/V-SYNC sent from the video card 120 in the computer 100. The display monitor 200 is composed of a microcomputer 210 receptive to the horizontal and vertical synchronizing signals H/V-SYNC, and discriminating a resolution; a control key section 220 for generating a screen control signal; a horizontal and vertical output circuit section 230 receptive to the screen control signal and a reference oscillating signal generated from the microcomputer 210, and synchronizing a raster; a video circuit section 240 for processing the RGB picture signals received from the video card 120 through amplification and displaying them; and a power supplying circuit section 250 for supplying a driving power to the microcomputer 210, the horizontal and vertical output circuit section 230, and the video circuit section 240.

Following is a detailed description of the respective blocks in the display monitor 200 of the construction.

Microcomputer 210 which stores all sorts of screen control data is receptive to the horizontal and vertical synchronizing signals H/V-SYNC sent from the video card 120, and generates an image adjusting signal and a reference oscillating signal in response to the screen control signal applied from the control key section 220.

Receiving the image adjusting signal and the reference oscillating signal from the microcomputer 210, a horizontal and vertical oscillating signal processor 231 supplies a vertical pulse to a vertical drive circuit 232. The vertical pulse is to control the switching rate of a sawtooth wave generating circuit in response to the horizontal and vertical synchronizing signals H/V-SYNC received from the video card 120.

As regards vertical drive circuit 232 receptive to the vertical pulse, most widely used are two types of them; one-stage vertical amplification type and emitter follower type. The emitter follower type vertical drive circuit has the base of the transistor therein used as an input with the emitter as an output. Hence, the vertical drive circuit 232 normally performs an operation for the improvement of linear characteristic not of the gain.

The vertical drive circuit 232, after amplification, supplies a drive current to a vertical output circuit 233, which will apply a sawtooth current corresponding to the vertical synchronizing pulse flowing through a V-DY, determining a vertical scanning period depending on the sawtooth current. In addition, a horizontal drive circuit 234 receives a horizontal oscillating signal from the horizontal and vertical oscillating processor 231, and accordingly, supplies a drive current high enough to switch the horizontal output circuit 235.

Upon receipt of the drive current from the horizontal drive circuit 234, the horizontal output circuit 235 will generate a sawtooth current to the H-DY, determining a horizontal scanning period depending on the sawtooth current. Such a horizontal drive circuit 234 is divided into two classes; in-phase type whose output is ON with the drive terminal ON, and out-of-phase type wherein the output is OFF with the drive terminal ON.

High-voltage circuit 236 and FET (flyback Transformer) 237 generate a high voltage in order to supply a stable DC voltage to the anode terminal 244a of a CRT (Cathode Ray Tube) 244. Even when a collector pulse is very weak, high-voltage circuit 235 and PBT 237 can generate a high voltage by use of a harmonic wave due to inductance and distribution capacity. This high voltage is applied to the anode terminal 244a of the CRT 244, forming a high voltage across the anodic surface of the CRT 244.

Simultaneously, the video circuit section 240 has an OSD (On Screen Display) IC 241 receiving an OSD data generated during the screen control of the microcomputer 210 to generate an OSD gain signal. This OSD gain signal from the OSD IC 241 is sent to a video pre-amplifier 242.

Upon receipt the OSD gain signal from the OSD IC 241 and the RGB picture signals from the video card 120, the video pre-amplifier 242 amplifies the RGB picture signals to a limited voltage level via a low-voltage amplifier.

For example, a signal less than 1 $V_{pp}$ is converted to the voltage of 4 to 6 $V_{pp}$ through an amplification in the video pre-amplifier 242. This picture signal is further amplified to 40 and 60 $V_{pp}$ in a video output amplifier 243 and then sent to the cathode of the CRT 244 for displaying an image. The image which has been produced through the CRT 244 in response to the RGB picture signals and the OSD signal has its scanning period determined by the H-DY and V-DY and is visually displayed on the screen of CRT 244. The RGB picture signals or the OSD signal which are amplified by the vide output amplifier 243 will be displayed as an image with the luminance regulated by the high voltage formed across the anode surface of CRT 244.

Power supplying circuit section 250, which is to provide a driving voltage for displaying the RG8 picture signals on the screen of the display monitor, receives an AC (Alternative Current) through an AC input 251. The AC is-applied to a degaussing coil 252, which resumes the color blotted due to the influence of the earth magnetic field or external environment to the original distinct one.

For this, degaussing coil 252 disperses the magnetic field of a DC component formed across the shadow mask in CRT 244 while an AC is applied to the degaussing coil 252 momentarily for 2–8 seconds, and prevents the electron beams from being deflected unstably due to the magnetic field.

The AC is normally rectified into a DC through a rectifier 251 and transmitted to a switching transformer 254. The switching transformer 254 supplies all sorts of driving voltage required in the monitor 200 via a voltage regulator 255. At this stage, PWM (Pulse Width Modulation) IC 256 controls the switching operation of the switching transformer 254, stabilizing the output voltage of the transformer.

Microcomputer 210 is under the control of a DPMS (Display Power Management Signaling) mode to economize power consumed in the display monitor 200. In this respect, the microcomputer 210 sets up a power-off mode and a suspend mode depending on the presence of horizontal and vertical synchronizing signals H/V-SNC, and accordingly saves the power in the display monitor 200.

If the user adjusts a screen or wants to have information about the display mode of the display monitor which is in a current use, he has to choose the OSD function through the control key section 220 as programmed in the microcomputer 210.

Upon the user's pressing a button for the OSD function, the microcomputer 210 serves the OSD function in response to a key signal through the OSD IC 241. In this case, the microcomputer 210 sends an OSD data already stored therein to the OSD IC 241, which processes the OSD data to generate an OSD gain signal to the video pre-amplifier 242 and the video output amplifier 243. The OSD gain signal is then displayed on the screen of the CRT 244 after amplification via those amplifiers 242 and 243.

Under the OSD signal, the CRT 244 displays menus relating to the OSD function on the screen. The user may choose one menu by using the control key section 220 to have information about display monitor, screen adjustment, display mode, horizontal and vertical frequencies, and the like.

The user who needs to have information with regard to the display mode with the OSD function programmed in the conventional display monitor, however, occasionally encounters several troubles in that it is hard to explore information in another display mode changed or to know whether the current display mode displayed on the monitor is in the optimum state or not.

SUMMARY OF THE INVENTION

An object of the present invention is to provide a method of displaying a display mode optimized to a display monitor with an OSD by adding to the OSD function a second function to display information about the display mode of interest whenever the display mode changes.

To achieve these and other advantages and in accordance with the purpose of the present invention, as embodied and broadly described, there is provided a method of displaying a present display mode comprising the steps of: detecting a changing of display mode; checking a status set for using of default information; determining a present display mode considering optimize; and displaying a information of the present display mode for a pre-determined time.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1:
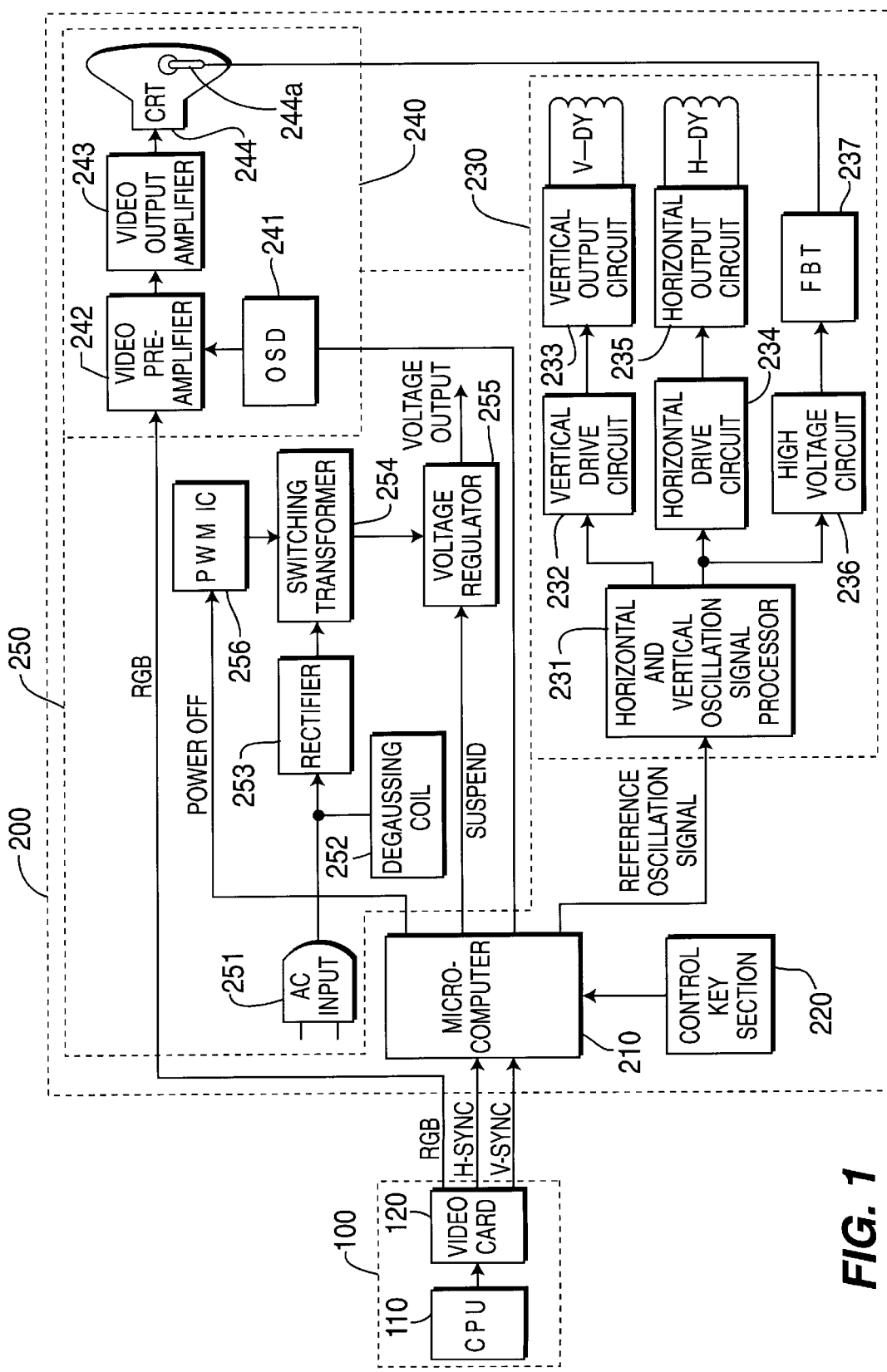
FIG. 1 is a block diagram of the internal circuit of a conventional display monitor.
Figure 2:
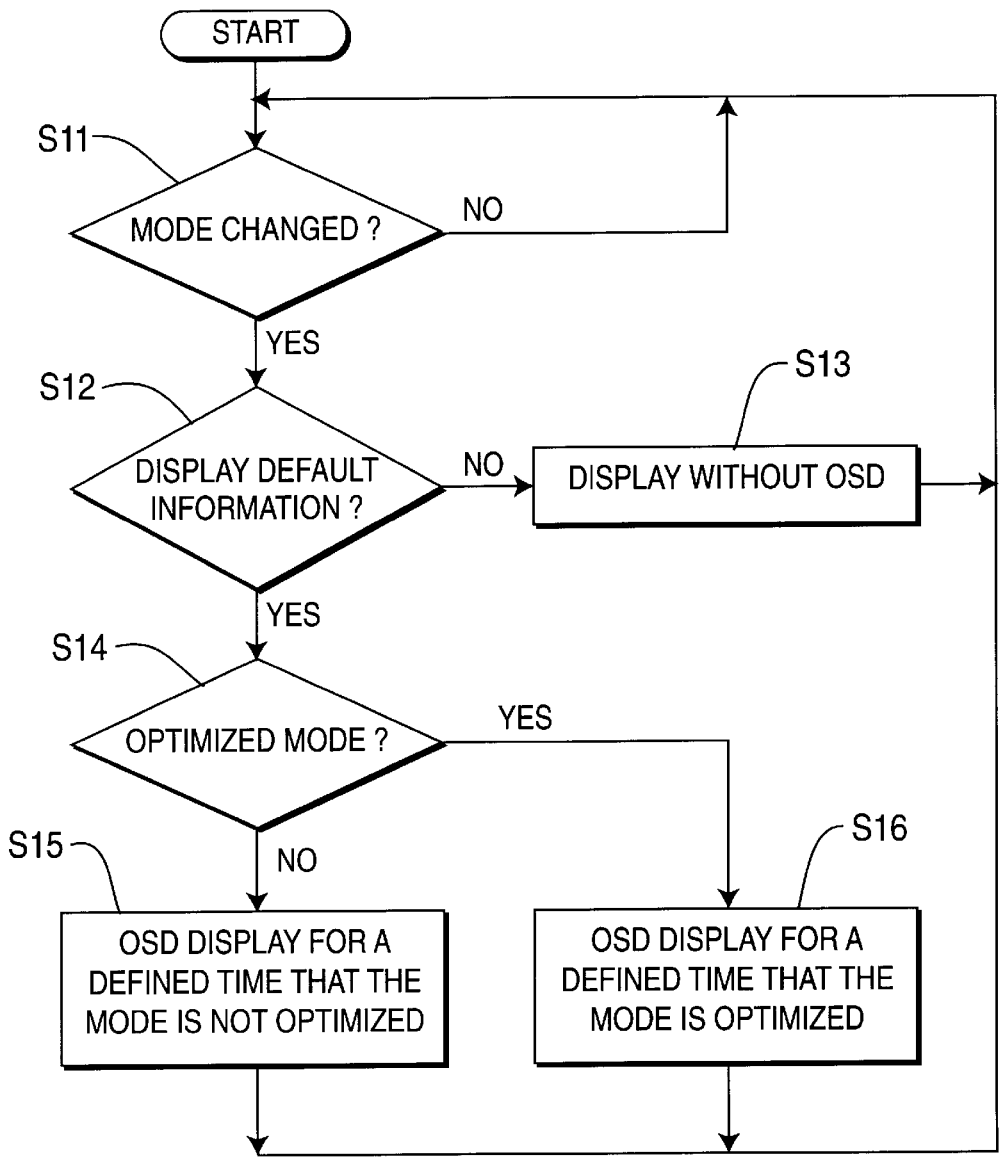
FIG. 2 is a flow diagram illustrating a method of displaying a display mode using an OSD in accordance with the present invention.

A method of displaying a display mode by using an OSD, is illustrated in FIG. 2. Checking whether the display mode has been changed. If the display mode has not been changed, returning to checking step (S11). Checking a status of setting for using of a default information (S12). In case of the status of setting for using of a default information is not set, displaying a normal display without the OSD (S13) Checking whether the display mode externally chosen is optimized to a display monitor which is in a current use, in case the default information is displayed in step (S14) Displaying a message for a defined time of period that the display mode is not optimized, when the display mode externally chosen is not optimized to the display monitor in step (S15). Displaying a message for a defined time of period that the display mode is optimized, where the display mode externally chosen is optimized to the display monitor in step (S16).

Figure 3:
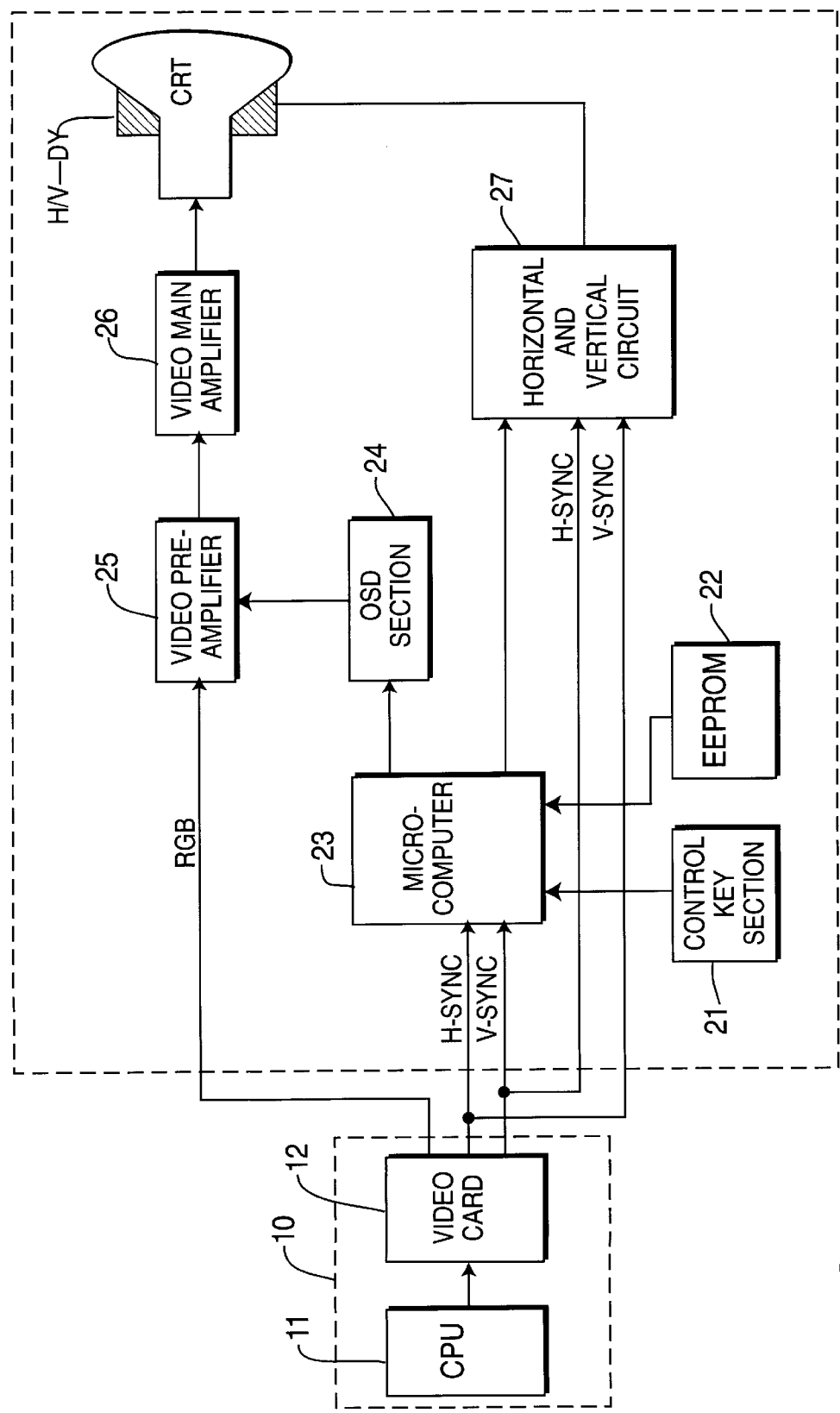
FIG. 3 is a block diagram of the internal circuit of a display monitor employing the method of displaying a display mode using an OSD in accordance with the present invention.

The operation of such a construction would be described in FIG. 3.

When a computer 10 changes the display mode, a menu for determining whether to display information relating to the changed display mode for a defined time of period without a separate operation of a control key section 21 will be added to an OSD control program in a microcomputer 23 of a display monitor 20.

If the display mode is changed through the control key section 21, there may be set a key for determining whether to display information about the changed display mode for a defined time of period without a separate operation, commonly called, "default key". Additionally, the data relating to the display mode optimized to the display monitor is already memorized in an EEPROM 22.

As the user presses the default key in the control key section 21, in step (S11), under the OSD control program to optimize the display mode to the display monitor. The selected default key is then sent to the microcomputer 23.

Upon receipt of the default key, microcomputer 23 receives the horizontal and vertical synchronizing signals H/V-SYNC to synchronize the RGB picture signals supplied from the video card 12 in the computer 10, discriminating the display mode of the RGB picture signals.

If there is no change in the display mode of the RGB picture signals, the microcomputer 23 waits for receipt of the next input of the display mode changed.

On the contrary, where the display mode of the RGB picture signals has been changed, the microcomputer 23 receives the horizontal and vertical synchronizing signals H/v-SYNC from the video card 12, discriminating the display mode of the RGB picture signals and simultaneously reading the data in regard to the display mode optimized to the display mode 20 that is memorized in the EEPROM 22.

Next, the microcomputer 23 determines whether to display the default information, in step (S12).

In case the default key of the control key section 21 is not chosen, normally a normal display without the OSD is displayed, in step (S13).

More concretely, the video pre-amplifier 25 of the display monitor 20 receives the RGB picture signals from the video card 12 of the computer 10 with the horizontal and vertical synchronizing signals H/V-SYNC sent to the microcomputer 23 from the vide cared 12.

Under the synchronizing signals, the microcomputer 23 discriminates the resolution of the RGB picture signals generated from the vide card 12 and reads the image adjustment data stored in the EEPROM 22, sending an image adjusting signal and a reference oscillating signal to the horizontal and vertical circuit 27.

The horizontal and vertical circuit 27 also receives the horizontal and vertical synchronizing signals H/v-SYNC from the video care 12 so as to generate horizontal and vertical sawtooth waves to the horizontal and vertical deflection yokes H/V-DY.

The RGB picture signals received from the video card 12 are amplified to a limited level by the pre-amplifier 25 and sent to the video main amplifier 26, which sends the RGE picture signals to the CRT after amplification.

The CRT which has received the RGB picture signals from the video main amplifier 26 displays an image in accordance with the periods of the horizontal and vertical sawtooth currents generated from the horizontal and vertical deflection yokes H/V-DY. That means, a normal display operation is performed in the display monitor 20 with response to the RGt picture signals processed by the computer 10.

During the period when such a normal display is displayed, the microcomputer 23 waits for receipt of the next input of the display mode changed.

Where the default key of the control key section 21 has chosen, and the microcomputer 23 has determined to display the default information, in step (S12), it will be checked, in step (S14), whether the RGB picture signals received from the video card 12 of the computer 10 with the display mode changed are in accord to all requirements for the display mode optimized to the display monitor 20 which is in a current use.

That means, the microcomputer 23 which has received the horizontal and vertical synchronizing signals H/V-SYNC from the video card 12 discriminates the display mode in response to the resolution of RGB picture signals received from the computer 10 and at the same time reads the data relating to the optimized display mode memorized in the EEPROM 22, comparing the optimized display mode with that of the RGB picture signals.

When the display mode of the RGB picture signals is not identical to that optimized to the display monitor 20 currently in use, for instance, the microcomputer 23 will display a message for a defined time of period that the display mode is not optimized, and simultaneously, generate an OSD data relating to the resolution and the horizontal and vertical frequencies of the RGB picture signals received from the computer 10 as well as to the message, in step (S15).

The OSD data is sent to the OSD section 24 so as to generate an OSD gain signal.

Video pre-amplifier 25 amplifies this OSD gain signal to a limited level and also the RGB picture signals received from the video card 12. Under the control of the microcomputer 23, the OSD gain signal and the RGB picture signals will be selectively sent to the video main amplifier 26 for the-final amplification and then transmitted to the CRT.

The OSD data, relating to the message that the display mode is not optimized, and the resolution and the horizontal/vertical frequencies of the RGE picture signals, is transmitted to the CRT and normally displayed in accordance with the horizontal and vertical sawtooth waves generated from the horizontal and vertical deflection yokes H/V-DY under the control of the horizontal and vertical circuit 27.

Normally, the OSD data is displayed in a defined time of period as is programmed in the microcomputer 23, for example, the OSD information may be displayed on the screen of the CRT for three seconds in an exemplary embodiment of the invention.

In case the display mode of the RGB picture signals sent from the computer 10 is turned out to be identical to that optimized to the display monitor 20 currently in use, the microcomputer 23 displays a message for a defined time of period that the display mode is optimized, and simultaneously, generates an OSD data relating to the resolution and the horizontal and vertical frequencies of the RGB picture signals received from the computer 10 as well as to the message, in step (S16).

The OSD data will be sent to the OSD section 24 so as to generate an OSD gain signal.

Video pre-amplifier 25 amplifies this OSD gain signal to a limited level and also the ROB picture signals received from the video card 12. The OSD gain signal and the RGB picture signals which have been transferred from the OSD section 24 and the video card 12, respectively, are selectively generated under the control of the microcomputer 23.

The OSD signal is supplied to the video main amplifier 26 and the CRT, thereby displaying the OSD information on the screen, wherein the OSD information relates to the message that the display mode is optimized, and the-resolution and the horizontal/vertical frequencies of the RGB picture signals.

The OSD information may be displayed for three seconds as programmed in the microcomputer 23.

Next, the microcomputer 23 waits for receipt of the next input again in step (S11). It means that the OSD information is cleared from the OSD screen and then the microcomputer 23 receives an input corresponding to a change to the next display mode.

From the OSD information which is displayed on the OSD screen of the CRT, the users can set the display mode of the picture signals generated from the computer in accordance to the condition of the optimized display mode of the display monitor currently used.

As described above, the present invention has an advantage that it allows the users to readily set all conditions for the display mode of the picture signals generated from the computer in accord to those for the display mode optimized to the display monitor in a current use, as well as to check the display mode without any difficulty.

It will be apparent to those skilled in the art that various modifications can be made in the a method of displaying display mode using osd of the present invention, without departing from the spirit of the invention. Thus, it is intended that the present invention cover such modifications as well as variations thereof, within the scope of the appended claims and their equivalents.

What is claimed is:

1. A method of displaying a present display mode of a display monitor; said method comprising the steps of:
   - detecting a changing of a display mode;
   - checking for activation of a default key of a control key section of said display monitor;
   - determining whether a present display mode is an optimized display mode for said display monitor when it is determined that said default key has been activated;
   - simultaneously displaying a message indicating that the present display mode is the optimized display mode and resolution information of the optimized display mode for a pre-determined time when it is determined that the present display mode is the optimized display mode; and
   - simultaneously displaying a message indicating that the present display mode is not the optimized display mode and resolution information of the present display mode for said pre-determined time when it is determined that the present display mode is not the optimized display mode.

2. The method as set forth in claim 1, wherein said step of displaying further comprises displaying horizontal and vertical frequency information for said optimized display mode or said present display mode.

3. The method as set forth in claim 1, wherein said step of displaying further comprises:
   - generating on screen display data from a microprocessor; and
   - generating an on screen gain signal in an on screen display circuit in response to said on screen data generated by said microprocessor, wherein said on screen display gain signal comprises said message indicating that the present display mode is the optimized display mode or not the optimized display mode and said resolution information of the optimized display mode or the present display mode.

4. The method as set forth in claim 1, wherein said on screen display gain signal further comprises displaying horizontal and vertical frequency information for said optimized display mode or said present display mode.

5. The method as set forth in claim 1, further comprising a step of displaying a video signal output from a computer when it is determined that said default key has not been activated.

6. The method as set forth in claim 1, wherein said step of determining whether a present display mode is an optimized display mode for said display monitor comprises:
   - receiving a video signal and synchronization signals from a video card of a computer to determining the present display mode of said video signal; and
   - comparing said present display mode to data corresponding to said optimized display mode to determine whether or not said present display mode is said optimized display mode.

7. The method as set forth in claim 1, wherein said step of determining whether a present display mode is an optimized display mode for said display monitor comprises:
   - providing a video signal and synchronization signals from a video card of a computer to a microcomputer of said display monitor to determine the present display mode of said video signal;
   - providing data corresponding to said optimized display mode from an electronically erasable programmable read only memory to said microprocessor; and
   - comparing said present display mode to said data corresponding to said optimized display mode to determine whether or not said present display mode is said optimized display mode.

8. A method of displaying a present display mode of a display monitor; said method comprising the steps of:
   - activating a default key of a control key section of said display monitor;
   - discriminating a display mode of a video signal provided to said display monitor to determine whether the present display mode has changed;
   - determining whether the discriminated display mode is an optimized display mode for said display monitor when it is determined that said display mode has changed;
   - simultaneously displaying a message indicating that the discriminated display mode is the optimized display mode and resolution information of the optimized display mode for a pre-determined time when it is determined that the display mode has changed; and
   - simultaneously displaying a message indicating that the discriminated display mode is not the optimized display mode and resolution information of the discriminated display mode for said pre-determined time when it is determined that the display mode has changed.

9. The method as set forth in claim 8, wherein said step of displaying further comprises displaying horizontal and vertical frequency information for said optimized display mode or said discriminated display mode.

10. The method as set forth in claim 8, wherein said step of displaying further comprises:
    - generating on screen display data from a microprocessor; and
    - generating an on screen gain signal from an on screen display circuit in response to said on screen data generated by said microprocessor, wherein said on screen display gain signal comprises said message indicating that the discriminated display mode is the optimized display mode or not the optimized display mode and said resolution information of the optimized display mode or the discriminated display mode.

11. The method as set forth in claim 8, wherein said on screen display gain signal further comprises displaying horizontal and vertical frequency information for said optimized display mode or said discriminated display mode.

12. The method as set forth in claim 8, wherein said step of determining whether a discriminated display mode is an optimized display mode for said display monitor comprises:
    - receiving the video signal and synchronization signals from a video card of a computer to discriminate the display mode of said video signal; and
    - comparing said discriminated display mode to data corresponding to said optimized display mode to determine whether or not said discriminated display mode is said optimized display mode.

13. The method as set forth in claim 8, wherein said step of determining whether a discriminated display mode is an optimized display mode for said display monitor comprises:

providing the video signal and synchronization signals from a video card of a computer to a microcomputer of said display monitor to discriminated the display mode of said video signal;

providing data corresponding to said optimized display mode from an electronically erasable programmable read only memory to said microprocessor; and comparing said discriminated display mode to said data corresponding to said optimized display mode to determine whether or not said discriminated display mode is said optimized display mode.

* * * * *